(12) United States Patent
Junkers

(10) Patent No.: US 7,647,808 B2
(45) Date of Patent: Jan. 19, 2010

(54) APPARATUS FOR CALIBRATION OF FLUID-OPERATED POWER TORQUE TOOLS

(76) Inventor: John K. Junkers, 14 Algonquin Trail, Saddle River, NJ (US) 07458

( * ) Notice: Subject to any disclaimer, the term of this patent is extended or adjusted under 35 U.S.C. 154(b) by 102 days.

(21) Appl. No.: 12/102,273

(22) Filed: Apr. 14, 2008

(65) Prior Publication Data

US 2009/0255320 A1 Oct. 15, 2009

(51) Int. Cl.
G01L 25/00 (2006.01)
(52) U.S. Cl. .............. 73/1.12; 073/1.08; 073/1.09; 073/11.01
(58) Field of Classification Search .......... 073/1.08, 073/1.09, 1.12, 11.01
See application file for complete search history.

(56) References Cited

U.S. PATENT DOCUMENTS

| | | | | |
|---|---|---|---|---|
| 2,703,976 | A | * | 3/1955 | Livermont ............ 73/1.12 |
| 3,321,962 | A | * | 5/1967 | Grady ............... 73/862.08 |
| 3,453,860 | A | * | 7/1969 | Stasiek ............... 73/1.12 |
| 3,456,486 | A | * | 7/1969 | Kross ................. 73/1.12 |
| 3,608,353 | A | * | 9/1971 | Larson ................ 73/1.12 |
| 3,979,942 | A | * | 9/1976 | Grabovac ............. 73/1.12 |
| 4,322,965 | A | * | 4/1982 | Bickford ............. 73/1.12 |
| 4,376,386 | A | * | 3/1983 | Green ................ 73/1.12 |
| 4,562,722 | A | * | 1/1986 | Schuele et al. ........ 73/11.01 |
| 4,649,757 | A | | 3/1987 | Crespin |
| 5,792,967 | A | | 8/1998 | Steber et al. |
| 5,911,154 | A | * | 6/1999 | Hsieh ................ 73/1.12 |
| 6,595,034 | B1 | * | 7/2003 | Crane et al. .......... 73/1.12 |
| 2003/0056605 | A1 | | 3/2003 | Chiapuzzi et al. |

FOREIGN PATENT DOCUMENTS

| | | | |
|---|---|---|---|
| JP | 03210447 | A * | 9/1991 |
| PL | 130929 | | 12/1983 |
| PL | 152384 | | 12/1990 |
| PL | 169708 | | 8/1996 |
| PL | 113285 | | 12/2003 |

OTHER PUBLICATIONS

PL 113285 University of Technology Lódź, Lódź, PL, 1982.
PL 130929 Uniwersity of Technology Wroclaw, PL, 1987.
PL 169708 REMA S.A., Reszel, PL, 1996.
PL 152384 University of Technology Warszawa, Warszawa, PL, 1991.

* cited by examiner

Primary Examiner—David A. Rogers
(74) Attorney, Agent, or Firm—Michael J. Striker

(57) ABSTRACT

An apparatus for calibration of a fluid-operated power torque tool having a housing and a drive has a non-turnable torque measuring unit for measuring a torque generated by the tool, a non-turnable abutment unit, a first connecting element configured for connecting the drive of the tool with the torque measuring unit, for measuring a torque generated by the tool when a fluid pressure is applied to the tool, an adjustable braking unit configured for providing an adjustable braking force, a second connecting element configured for connecting the housing of the tool with the adjustable braking unit to apply the adjustable braking force to the housing so as to increase a turning resistance to turning of the housing of the tool, so that when the tool is operated the housing of the tool starts turning at a force determined by the braking unit while the drive of the tool apply an opposite and equal force to the measuring unit, so that when the braking force is increased a fluid pressure required for the tool increases and the tool can be calibrated, by determining the generated torque that corresponds to the applied fluid pressure, without inertia.

4 Claims, 4 Drawing Sheets

APPARATUS FOR CALIBRATION OF FLUID-OPERATED POWER TORQUE TOOLS

BACKGROUND OF THE INVENTION

The present invention relates to a calibration equipment for calibration of fluid operated power torque tools.

Most torque tools require calibration to assure that with a given air or hydraulic pressure applied to the tool a given torque is achieved by the tool. Calibration of power torque tools is accomplished by abutting with a reaction arm against a stationary object, which is usually a part of the calibration stand or is made a part of the calibration stand, and by inserting a square drive of the tool into a corresponding opening of a part that measures the force applied by the square drive. This calibration stand measures the applied force without movement of either the reaction part or the drive part of the tool and it is widely accepted. However, it is not suited for faster running torque tools, since their calibration would be highly accurate if one of the parts was moving during the calibration, so as to avoid influence of inertia in the higher speed tools on the calibration results.

SUMMARY OF THE INVENTION

Accordingly, it is an object of the present invention to provide an apparatus for calibration of fluid operated power torque tools, which is a further improvement of the existing calibration equipment of this type.

In keeping with these objects and with others which will become apparent hereinafter, one feature of the present invention resides, briefly stated, in an apparatus for calibration of a fluid-operated power torque tool having housing means and drive means, the apparatus comprising a non-turnable torque measuring unit for measuring a torque generated by the tool; a non-turnable abutment unit; first connecting means configured for connecting the drive means of the tool with said torque measuring unit, for measuring a torque generated by the tool when a fluid pressure is applied to the tool; an adjustable braking unit configured for providing an adjustable braking force; second connecting means configured for connecting the housing means of the tool with said adjustable braking unit to apply the adjustable braking force to the housing means so as to increase a turning resistance to turning of the housing means of the tool, so that when the tool is operated the housing means of the tool starts turning at a force determined by said braking unit while the drive means of the tool apply an opposite and equal force to said measuring unit, so that when the braking force is increased a fluid pressure required for the tool increases and the tool can be calibrated, by determining the generated torque that corresponds to the applied fluid pressure, without inertia.

Since all torque tools apply an equal and opposite force, it is irrelevant which of the two connecting means turns and which stands stills to apply the turning force to the part that measures the force.

Calibration takes place by comparing the pneumatic pressure or the hydraulic pressure applied to the fluid-operated tool with the torque output measured by the torque measuring unit. For example, the torque output can be registered at intervals of 500 psi from 1,500 to 10,000 psi for hydraulic tools, and at intervals of 5 psi from 20 to 90 psi for pneumatic tools. For the hydraulic tools both connecting means can remain stationary during the calibration. For the pneumatic tools, it is recommended that one of the two connecting means turns. This means that to raise the pressure, the turning resistance of a tool part that turns has to be increased, and this is done by the adjustable braking unit, so that one of the tool parts of the pneumatic torque tool turns consistently, while the tool is being calibrated at pressures from 20 psi to 90 psi or even 100 psi.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
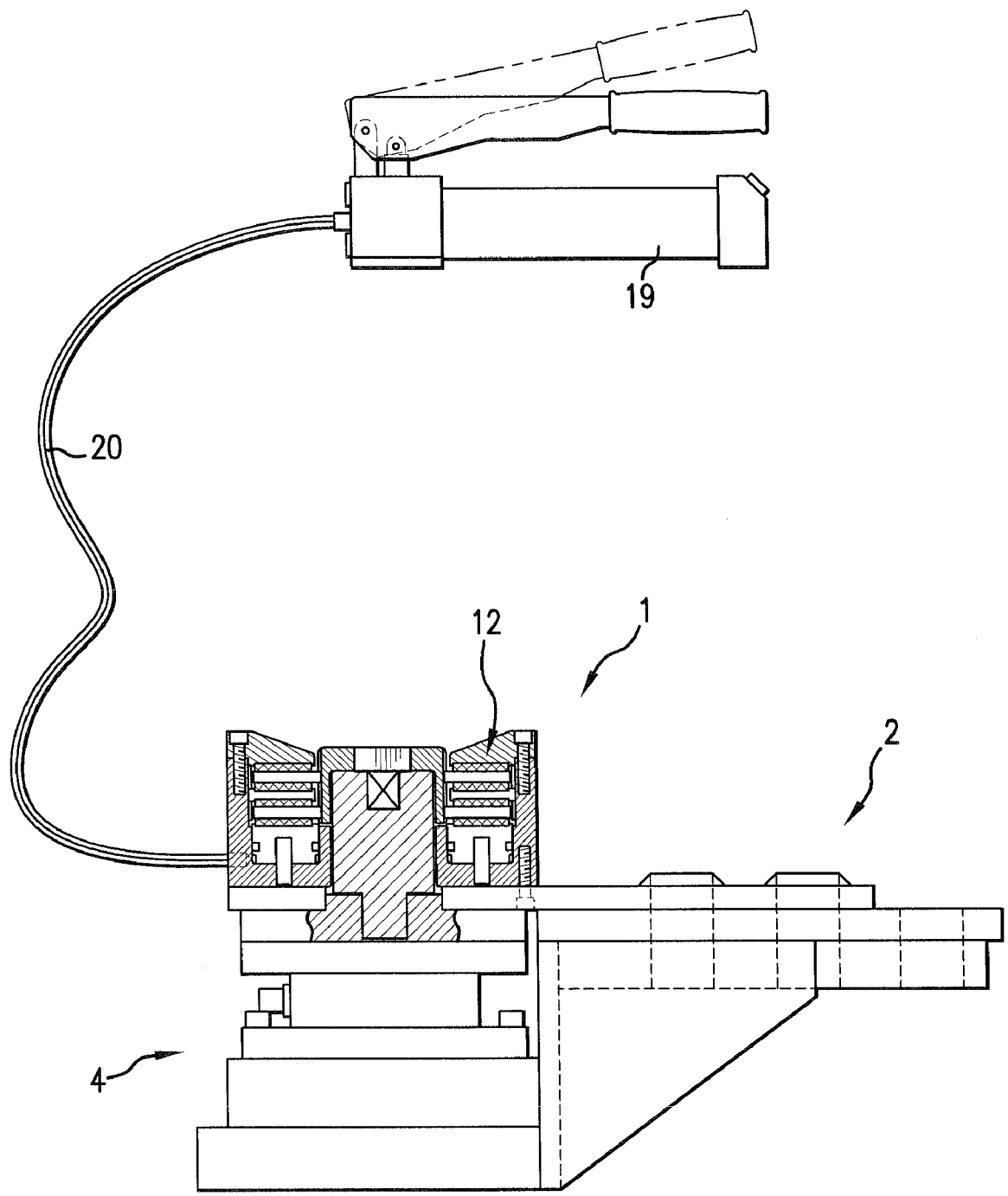
FIG. 1 is a view showing a calibration equipment including an inventive apparatus for calibration of a fluid-operated power torque tool.

A calibration apparatus in accordance with the present invention is identified as a whole with reference numeral 1.

The calibration apparatus of the present invention has a non-turnable unit 2, which includes for example by a mounting plate 3 that is non-turnably connected to an existing calibration stand.

The calibration apparatus of the present invention further has a non-turnable torque measuring unit 4 which includes a torque transducer 5 with a support 6 that is non-turnably connected with the calibration stand.

The torque transducer 5 of the torque measuring unit 4 is connected with a digital display unit 7. The display unit displays values of pressures, applied for example by a working fluid to the fluid-operated power torque tool, and values of torque, generated by the power torque tool and measured by the torque transducer.

The torque transducer 5 is provided with not shown means for measuring the torque. These means can be formed for example as known strain gauges, that are connected for example in a Whitstone bridge circuit, and detect a tension or strain of the drive means of the power torque tool inserted in the torque transducer, and generate corresponding electrical signals.

Figure 2:
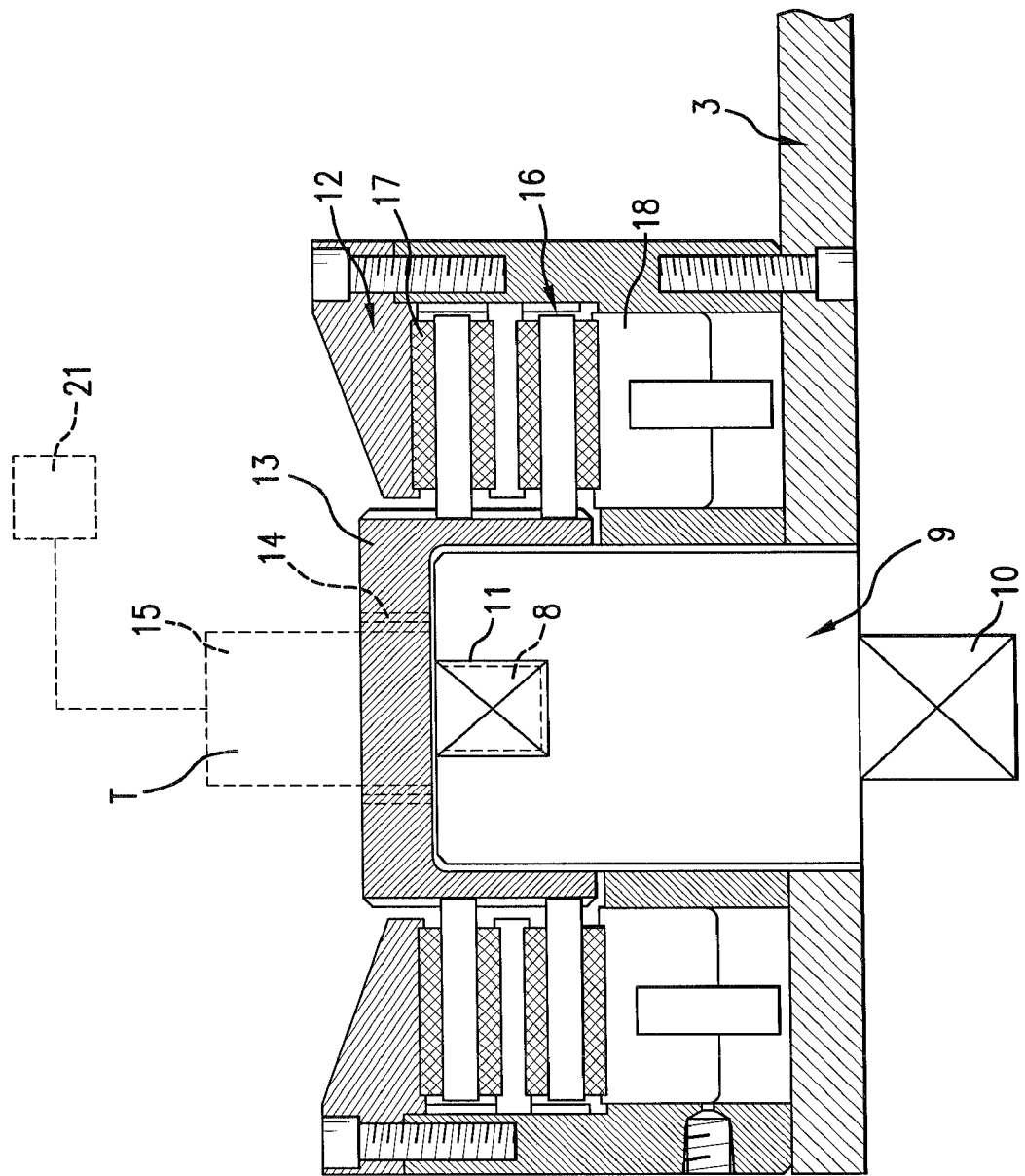
FIG. 2 is a view showing a major part of the inventive apparatus for calibration, with a braking unit, on a larger scale.
Figure 3:
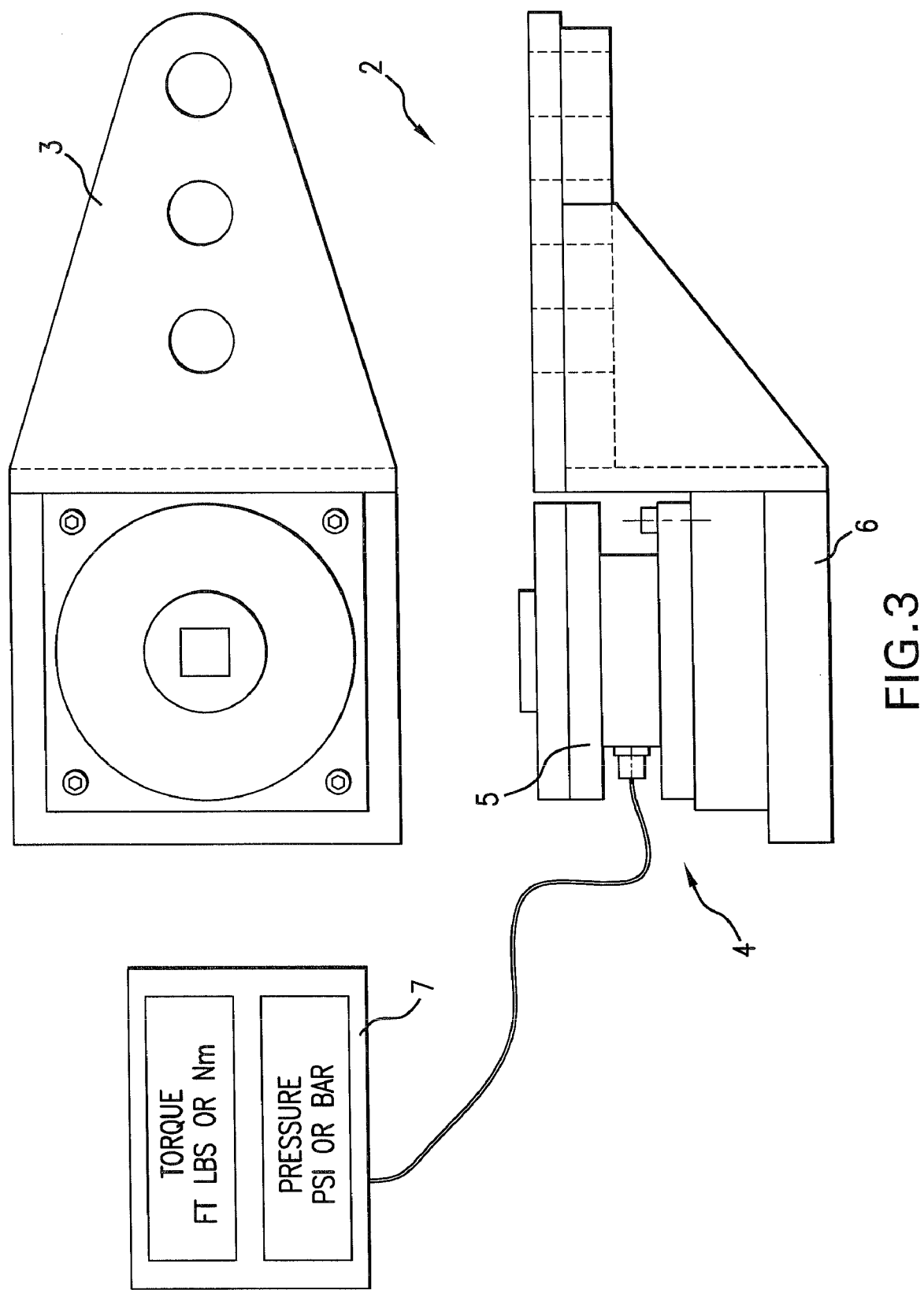
FIG. 3 is a view of the inventive apparatus for calibration of a power torque tool without a torque measuring unit.
Figure 4B:
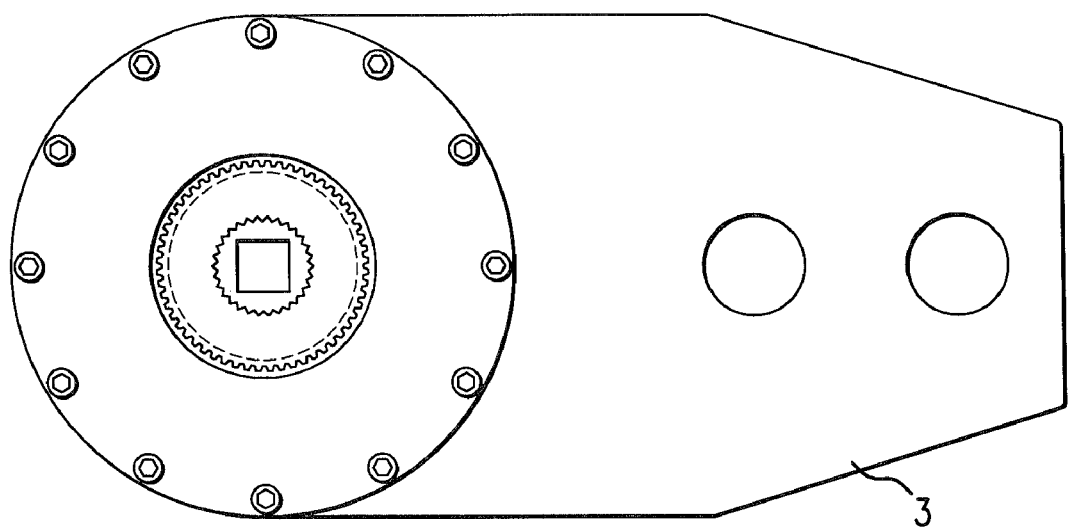
FIGS. 4a and 4b are a side view and a plan view of the torque measuring unit of the inventive apparatus for calibration of a power torque tool.
Figure 4A:
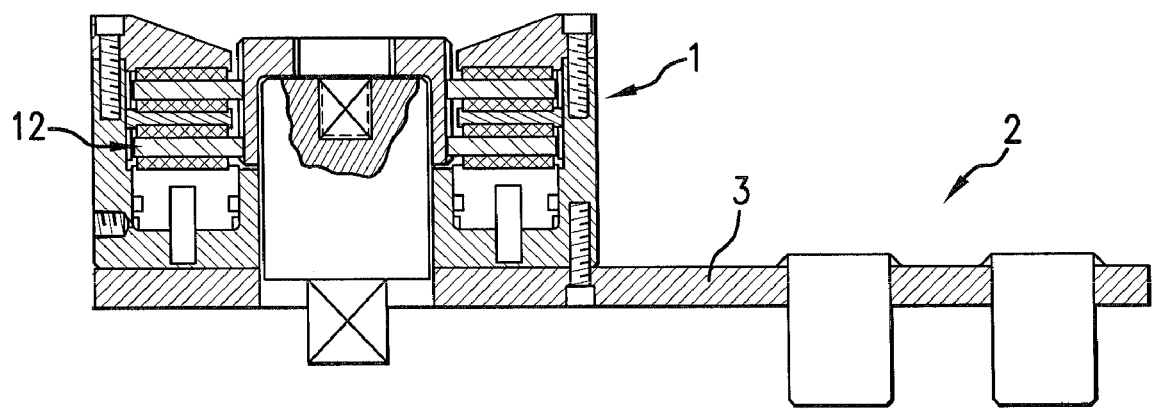

The calibration apparatus further has first connecting means which connect drive means 8 of the power torque tool T with the torque measuring unit 4. The first connecting means can be formed as an adaptor 9 which has a projection 10 (for example non-circular) engaging in a corresponding not shown opening of the torque transducer 5, and an opening 11 (for example non-circular) for receiving the drive means 8 of the power torque tool T, so that the drive means 8 of the power torque tool is non-turnably connected with the torque measuring unit 4, as shown in FIG. 2.

The calibration apparatus further has an adjustable braking unit which is identified as a whole with reference numeral 12. The adjustable braking unit has a composite brake element, which can include an exchangeable sleeve 13 provided with an inner opening 14 (for example splined) that is non-turnably engageable with housing means 15 of the power torque tool, and a plurality of brake disks 16 which are non-turnably connected with the sleeve, for example by engaging into vertical splines on the outer surface of the sleeve 13. Brake pads 17 are arranged on the brake disks 16. A fluid chamber 18 is associated with the brake pads 17 and the brake disks 16 and is supplied with a fluid, for example by a hand pump 19 through a hose 20.

Finally, reference numeral 21 identifies a working fluid source with an adjustable fluid pressure, which supplies the working fluid to the power torque tool.

It is to be clear that a plurality of the adaptors 9 with different sizes of their openings 11 and a plurality of the sleeves 13 with different sizes of their openings 14 can be provided for adaptation to different sizes of the drive means 8 and the housing means 15 of different power torque tools.

The apparatus for calibration of a fluid-operated power torque tool in accordance with the present invention operates in the following manner:

A fluid-operated power torque tool T is introduced into the apparatus so that its drive means 8 is non-turnably connected with the torque measuring unit 4, and its housing means 15 is non-turnably connected with the braking unit 12. Working fluid is introduced from the working fluid source 21 into the power torque tool T, so as to activate the power torque tool. A corresponding fluid medium is introduced into the chamber 18 of the brake unit 12 to increase a resistance to turning of the housing means 15 of the power torque tool. The housing means 15 starts turning at a force determined by the braking unit 12, while the drive means 8 applies an opposite and equal force to the torque measuring unit 4. As the turning resistance of the brake disks 16 of the braking unit 12 is increased, a pressure required for the power torque tool to turn the brake disks 16 increases. The power torque tool can be calibrated without inertia. Each fluid pressure applied by the fluid source 21 to the power torque tool and the generated torque measured by the torque measuring unit 3 are displayed on the display of the display unit 7.

For calibration of hydraulic tools the torque can be registered for example at intervals of 500 psi from 1500 to 10,000 psi, and for calibration of pneumatic tools it can be registered for example at intervals of 5 psi from 20 to 90 psi. During the calibration of the hydraulic tools the connecting means that connect the drive means of the power torque tool and the connecting means which connect the housing means of the power torque tool to the calibration apparatus can remain stationary. During calibration of pneumatic tools it is recommended that one of the two connecting means turns.

It will be understood that each of the elements described above, or two or more together, may also find a useful application in other types of constructions differing from the type described above.

While the invention has been illustrated and described as embodied in an apparatus for calibration fluid-operated power torque tools, it is not intended to be limited to the details shown, since various modifications and structural changes may be made without departing in any way from the spirit of the present invention.

Without further analysis, the foregoing will so fully reveal the gist of the present invention that others can, be applying current knowledge, readily adapt it for various applications without omitting features that, from the standpoint of prior art, fairly constitute essential characteristics of the generic or specific aspects of this invention.

The invention claimed is:

1. An apparatus for calibration of a fluid-operated power torque tool having housing means and drive means, the apparatus comprising a non-turnable torque measuring unit for measuring a torque generated by the tool; a non-turnable abutment unit; first connecting means configured for connecting the drive means of the tool with said torque measuring unit, for measuring a torque generated by the tool when a fluid pressure is applied to the tool; an adjustable braking unit configured for providing an adjustable braking force; second connecting means configured for connecting the housing means of the tool with said adjustable braking unit to apply the adjustable braking force to the housing means so as to increase a turning resistance to turning of the housing means of the tool, so that when the tool is operated the housing means of the tool starts turning at a force determined by said braking unit while the drive means of the tool apply an opposite and equal force to said measuring unit, so that when the braking force is increased a fluid pressure required for the tool increases and the tool can be calibrated, by determining the generated torque that corresponds to the applied fluid pressure, without inertia.

2. An apparatus as defined in claim 1, wherein said braking unit includes at least one brake disk associated with said second means for connecting said braking unit with the housing means of the tool.

3. An apparatus as defined in claim 2; and further comprising means for applying a force to said brake disk to increase the braking force applied by said braking unit to the housing means of the tool.

4. An apparatus as defined in claim 1; and further comprising means for displaying fluid pressures applied to the tool and corresponding torques generated by the tool and measured by said torque measuring unit.

* * * * *